US011483442B2

(12) United States Patent
Tanchak et al.

(10) Patent No.: US 11,483,442 B2
(45) Date of Patent: Oct. 25, 2022

(54) MODIFYING STORED LIFE SET POINTS FOR COMPONENTS IN A MULTI-FUNCTION DEVICE

(71) Applicant: Xerox Corporation, Norwalk, CT (US)

(72) Inventors: Rachel Lynn Tanchak, Rochester, NY (US); Erwin Ruiz, Rochester, NY (US); Carlos M. Terrero, Ontario, NY (US); Kareem Tawil, Pittsford, NY (US); Linn C. Hoover, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 28 days.

(21) Appl. No.: 17/131,426

(22) Filed: Dec. 22, 2020

(65) Prior Publication Data

US 2022/0201131 A1   Jun. 23, 2022

(51) Int. Cl.
*H04N 1/00* (2006.01)
*G06Q 10/10* (2012.01)
(Continued)

(52) U.S. Cl.
CPC ... *H04N 1/0097* (2013.01); *G06Q 10/063118* (2013.01); *G06Q 10/1095* (2013.01); *G06Q 10/20* (2013.01); *H04N 1/00037* (2013.01); *H04N 1/00042* (2013.01); *H04N 1/00068* (2013.01); *H04N 1/00074* (2013.01); *H04N 1/00082* (2013.01); *H04N 1/00344* (2013.01); *H04N 1/00973* (2013.01); *H04N 2201/0094* (2013.01)

(58) Field of Classification Search
CPC .......... G06F 3/12–1298; G06F 2206/15–1514; G06K 15/00–024; G06K 15/18–1823; G06K 15/1827–1834; G06K 15/1856–1865; G06K 15/1882–1888; G06K 15/40–4095; G06K 2215/0002–0037; G06K 2215/0082–0091; G06K 2215/0097; H04N 1/00–00002; H04N 1/00007–00001; H04N 1/00015; H04N 1/00021; H04N 1/00026–00042; H04N 1/0005–009; H04N 1/0095–00517; H04N 1/00763–00782; H04N 1/0083–00832; H04N 1/00838–00907; H04N 1/00912–00997; H04N 1/21; H04N 1/2307–2392; H04N 1/32–32138; H04N 1/32358–36; H04N 1/42–4493; H04N 2201/0008–098; H04N 2201/21–3267; H04N 2201/3273–33371; H04N 2201/33385–33392; Y02D 10/159
USPC ....................................... 358/1.15
See application file for complete search history.

(56) References Cited

U.S. PATENT DOCUMENTS 6,040,921 A  *  3/2000 Hayashi ............. H04N 1/00063
                                                              358/442
8,045,865 B2   10/2011 Kamprath
(Continued)

*Primary Examiner* — Negussie Worku

(57) ABSTRACT

A method is disclosed. For example, the method executed by a processor of a multi-function device (MFD) includes monitoring operating parameters of a component in the MFD, calculating a life set point for the component based on the operating parameters, and changing a default life set point for the component stored in a memory of the MFD to the life set point that is calculated based on the operating parameters.

16 Claims, 5 Drawing Sheets

(51) Int. Cl.
    *G06Q 10/00* (2012.01)
    *G06Q 10/06* (2012.01)

(56) References Cited

U.S. PATENT DOCUMENTS

| | | | |
|---|---|---|---|
| 8,965,949 B2 | 2/2015 | Thieret | |
| 10,977,531 B1* | 4/2021 | Nakamura | G06K 15/1898 |
| 11,086,309 B2* | 8/2021 | Kasahara | G05B 23/0264 |
| 11,095,777 B1* | 8/2021 | Tanaka | G06K 15/408 |
| 11,201,971 B1* | 12/2021 | Tanaka | H04N 1/00074 |
| 2003/0194689 A1* | 10/2003 | Kamasaka | G06F 40/221 |
| | | | 434/323 |
| 2009/0119066 A1* | 5/2009 | Strong | G05B 23/0283 |
| | | | 399/24 |
| 2017/0286844 A1* | 10/2017 | El Mernissi | G06F 16/90335 |
| 2019/0312986 A1* | 10/2019 | Tachibana | G06F 3/1204 |
| 2021/0250444 A1* | 8/2021 | Piaggio | G06Q 30/0201 |

\* cited by examiner

MODIFYING STORED LIFE SET POINTS FOR COMPONENTS IN A MULTI-FUNCTION DEVICE

The present disclosure relates generally to multi-function devices (MFDs), and relates more particularly to modifying stored life set points for components in MFDs.

BACKGROUND

Multi-function devices (MFDs) are used to process print jobs. An MFD can perform a variety of different functions including printing, scanning, copying, faxing, and the like.

MFDs include a variety of components that can be worn down and fail over time. These components can be replaced. Replacing various components can be expensive if the components are replaced too soon. If the components are replaced too late, the MFD may be inoperable until the component is replaced, which may also lead to increased costs and/or inefficiencies.

In addition, some components may be replaced by a service provider. For example, a service technician may be deployed to the location of the MFD to replace the component. The service technician may power down the MFD and replace various components that need to be replaced on site.

SUMMARY

According to aspects illustrated herein, there are provided a method and a non-transitory computer readable medium for adjusting life set points stored in an MFD. One disclosed feature of the embodiments is a method, executed by a processor of the MFD, that comprises monitoring operating parameters of a component in the MFD, calculating a life set point for the component based on the operating parameters, and changing a default life set point for the component stored in a memory of the MFD to the life set point that is calculated based on the operating parameters.

Another disclosed feature of the embodiments is a non-transitory computer-readable medium having stored thereon a plurality of instructions, the plurality of instructions including instructions which, when executed by a processor, cause the processor to perform operations to monitor operating parameters of a component in the MFD, calculate a life set point for the component based on the operating parameters, and change a default life set point for the component stored in a memory of the MFD to the life set point that is calculated based on the operating parameters.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to modify stored life set points for components in MFDs. As discussed above, some MFDs may include a variety of components that can be worn down and fail over time. These components may be referred to as high frequency service items (HFSIs) that can be replaced or serviced frequently.

Replacing various components can be expensive if the components are replaced too soon. If the components are replaced too late, the MFD may be inoperable until the component is replaced, which may also lead to increased costs and/or inefficiencies. Each component may come with a default life set point that is used by each MFD. However, each MFD may operate differently. For example, different customers may have different types of print jobs, print media sizes, types of toner or ink, different volume of print jobs, different environmental conditions where the MFD is located, and the like. Thus, some components may have higher life set points in different MFDs depending on how the MFDs are operated, while other components may have lower life set points.

The present disclosure uses machine learning to monitor how each MFD is operated. Based on operation of the MFD and known optimal operating parameters for different components, the MFD may automatically change the value of stored life set points for different components in the MFD. Thus, each MFD may have unique life set point for a component.

In some embodiments, data collected from a plurality of different MFDs over a network may be analyzed to determine how different operating parameters may affect the life set point for different components. The data may be used to suggest optimal operating parameters for a customer's MFD to extend the life set point of various components in the MFD.

In addition, some components may be replaced by a service provider. For example, a service technician may be deployed to the location of the MFD to replace the component. The service technician may power down the MFD and replace various components that need to be replaced on site. However, replacing components during a busy time may be undesirable for the customer.

An embodiment of the present disclosure may use the data collected from monitoring operation of the MFD to change life set points for a component to determine the best time to replace the component. For example, the data may indicate various days of the week and times during the day that the MFD has a relatively low usage rate. The MFD may suggest the date and time to the customer for replacement of a component that has reached a life set point. If confirmed, the MFD may automatically communicate with a scheduling database of a service provider to schedule the suggested date and time for a service appointment. As a result, the efficiency of replacing a component in the MFD, or several components in the MFD, with a single visit from the service technician may be optimized.

Figure 1:
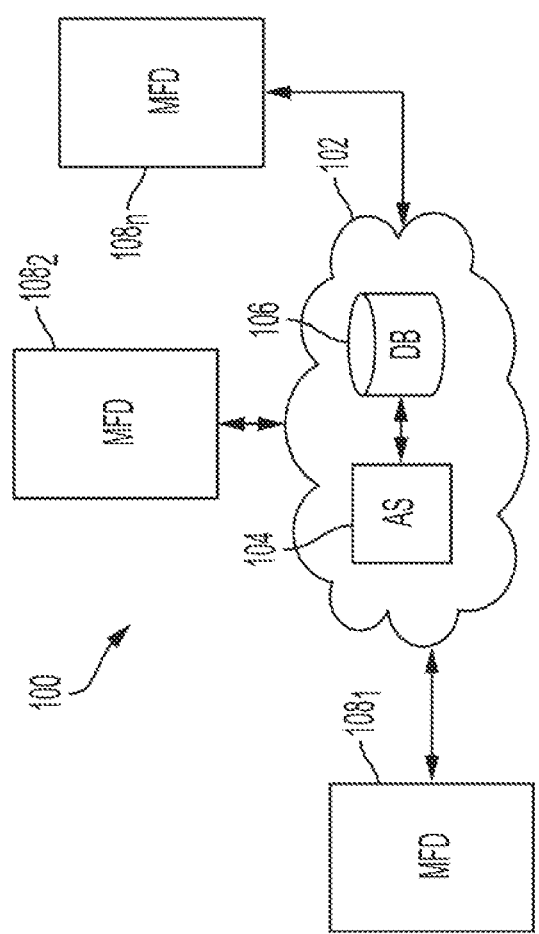
FIG. 1 illustrates a block diagram of an example network with an MFD of the present disclosure.

FIG. 1 illustrates an example network 100 of the present disclosure. In one embodiment, the network 100 may include a plurality of MFDs $108_1$-$108_n$ (hereinafter also referred to individually as an MFD 108 or collectively as MFDs 108). The MFDs 108 may be any type of device that can perform print functions, copying functions, scanning functions, faxing functions, scan and email functions, and the like.

In one embodiment, the MFDs 108 may be located in different locations. For example, the MFDs 108 may be located in different locations within a building or at different buildings across different geographic locations.

In one embodiment, the MFDs 108 may be networked together via an Internet Protocol (IP) network 102. The IP network 102 may include an application server (AS) 104 and a database (DB) 106. Although a single AS 104 and single DB 106 is illustrated in FIG. 1, it should be noted that any number of application servers and databases may be deployed in the IP network 102. The AS 104 and the DB 106 may be operated by a service provider that manages the operation and maintenance of the MFDs 108 deployed at different locations and/or different customer sites.

It should be noted that the IP network 102 has been simplified for ease of explanation. For example, the IP network 102 may include additional network components that are not shown. For example, the IP network 102 may include additional access networks, a gateway, a firewall, various network elements, and the like.

In one embodiment, the AS 104 and the DB 106 may monitor operation parameters of the MFDs 108 that can be used to change life set points of various components within a particular MFD 108, as discussed in further details below. The DB 106 may also include a scheduling database for service technician appointments to replace components of various MFDs 108. In one embodiment, the MFDs 108 may automatically communicate with the AS 104 to schedule a service appointment when a life set point of a component has been reached and the component is to be replaced. The AS 104 may schedule the date and time of the appointment in the scheduling database stored in the DB 106.

Figure 2:
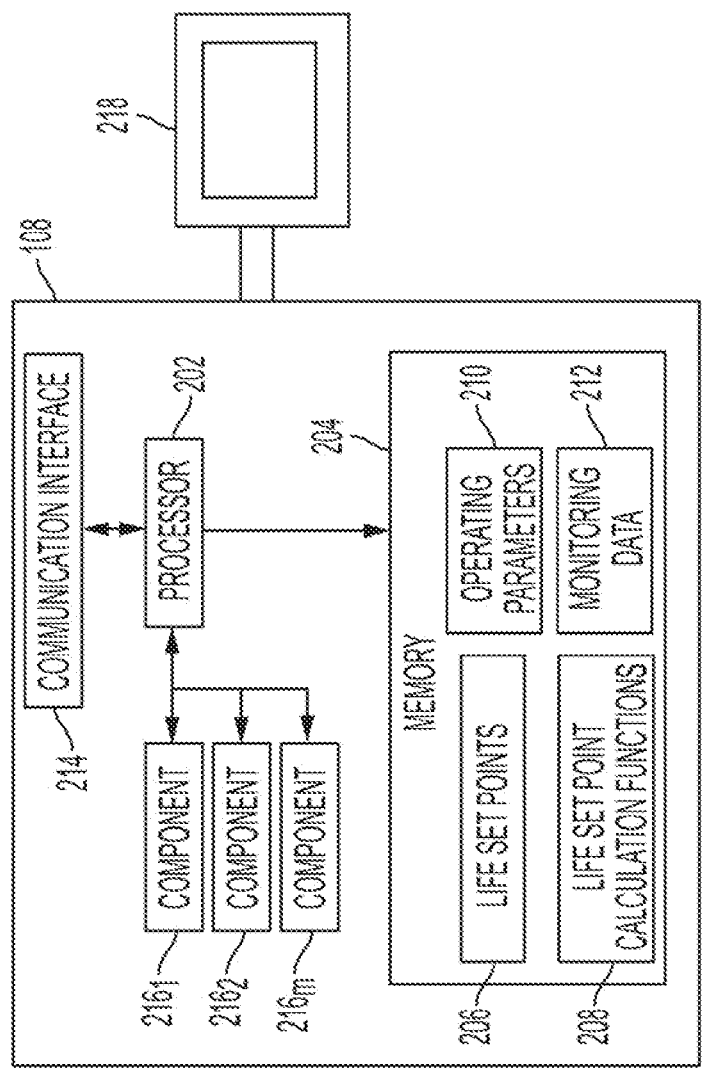
FIG. 2 illustrates a block diagram of an example MFD of the present disclosure.

FIG. 2 illustrates a block diagram of an example MFD 108 of the present disclosure. In one embodiment, the MFD 108 may include a processor 202, a memory 204, a communication interface 214, one or more components $216_1$ to $216_m$ (hereinafter also referred to individually as a component 216 or collectively as components 216), and a display 218. It should be noted that the MFD 108 has been simplified for ease of explanation and may include additional components that are not shown. For example, the MFD 108 may include an optical scanner, a print path, a printhead, a paper tray, various finishing modules, an output tray, and the like.

In one embodiment, the processor 202 may be communicatively coupled to the memory 204, the communication interface 214, the one or more components 216, and the display 218. The processor 202 may execute instructions stored in the memory 204 to perform the functions described herein. The memory 204 may be a non-transitory computer readable medium, such as, a random access memory (RAM), a read only memory (ROM), a solid state drive, a hard disk drive, and the like. In one embodiment, the memory 204 may store life set points 206, life set point calculation functions 208, operating parameters 210, and monitoring data 212. The processor 202 may also control operation of the communication interface 214, the components 216, and the display 218.

In one embodiment, the communication interface 214 may be a wired or wireless communication interface. The communication interface 214 may be a WiFi radio, an Ethernet connection interface, and the like. The communication interface 214 may establish a communication path with the AS 104 to exchange notifications, data, and the like. As noted above, and discussed in further details below, the MFD 108 may automatically schedule service technician appointments for replacement of the components 216, transmit notifications to administrators or engineers when a life set point of a component 216 is reached, and the like.

In one embodiment, the display 218 may be a graphical user interface (GUI). In one embodiment, the display 218 may be a touch screen interface that allows users to make selections by touching the display 218. In one embodiment, the display 218 may have a keyboard or physical buttons that allow a user to make selections shown on the display 218.

In one embodiment, the components 216 may be high frequency service items (HFSIs) that may be worn out over time and be replaced. Each component 216 may have a set life set point that is stored as life set points 206 stored in the memory 204. In one embodiment, each component 216 may be associated with a default life set point that may be set by a manufacturer.

For example, the components 216 may include a fuser roll, a photoreceptor, a transfer assist blade, a transfer belt, and the like. Each component 216 may have a different default life set point. The life set point may be a value that represents a number of pages printed, a number of revolutions, a number of cycles, and the like. For example, a life set point of a photoreceptor drum may be set to a value of 750,000 revolutions, a life set point of a transfer assist blade may be set to a value of 500,000 pages printed, and the like.

The present disclosure may change the default life set point to a calculated life set point based on operating parameters of the MFD 108. The operating parameters may be stored in the memory 204 as the operating parameters 210. In one embodiment, the life set point may be calculated based on a comparison to known operating parameters stored in the DB 106. For example, different combinations of operating parameters from different MFDs 108 may be stored in the DB 106. A life set point may be associated with each combination of operating parameters. Thus, for a particular MFD 108, the operating parameters 210 may be compared to the known operating parameters to find the associated life set point. When a match is found, the life set point associated with the known operating parameters that match the operating parameters 210 may be used as the calculated life set point.

In one embodiment, the life set point may be calculated based on a function for a particular component 216 that correlates the operating parameters 210 to a particular life set point. For example, each component $216_1$ to $216_m$ may have a pre-determined function that can be used to calculate a life set point based on the operating parameters 210. The life set point calculation functions 208 may be stored in the memory 204, as noted above and illustrated in FIG. 2.

In one embodiment, the life set point calculation functions 208 may be predetermined based on observations from a particular MFD 108 or from all of the MFDs 108 in the network 100. For example, operating parameters of the MFDs 108 may be collected as well as when the components 216 were replaced in each one of the MFDs 108 (e.g., the actual life set point compared to the default life set point). For example, different MFDs 108 may operate at different operating parameters. In addition, some customers may ignore warnings when a default life set point is reached for a component and continue operating the MFD 108. The operating parameters and the actual life set points (e.g., when the component is actual replaced) may be correlated into a function that provides a calculated life set point.

In one embodiment, different components 216 may have different life set point calculation functions. Thus, for a particular component 216, the appropriate function may be obtained from the life set point calculation functions 208 stored in the memory 204. The operating parameters 210 may be entered into the function and a life set point may be calculated based on the operating parameters. The calculated life set point may be different than the default life set point. The value of the life set point 206 stored in memory 204 for a particular component 216 may be changed or updated with the calculated life set point.

In one embodiment, the operating parameters 210 may include environmental conditions where the MFD 108 is located and/or settings for a job executed by the MFD 108 (e.g., a print job, a copy job, a scan job, and the like). The environmental conditions may include a temperature in the room, a humidity level in the room, and the like. The settings for the job may include a job length (e.g., how many copies or pages), a media size, an area of coverage, a frequency of usage of the MFD 108, internal print quality adjustments, and the like.

These different operating parameters 210 associated with different MFDs 108 may cause the components 216 in the different MFDs 108 to wear at different rates. As a result, the same component 216 in different MFDs 108 may have different calculated life set points based on different operating parameters associated with different MFDs 108. For example, the component 216 may be a fuser roll. A fuser roll in the MFD 108$_1$ may operate with print jobs that user heavier paper and larger sizes. In addition, the MFD 108$_1$ may operate in a relatively hot and humid environment. A fuser roll in the MFD 108$_2$ may operate with print jobs that use lighter paper and smaller media sizes. In addition, the MFD 108$_2$ may operate in a relatively cool and dry environment compared to the location of the MFD 108$_1$. Thus, the calculated life set point for the fuser roll in the MFD 108$_1$ may be lower than the calculated life set point for the fuser roll in the MFD 108$_2$. In other words, the same fuser roll may have different calculated life set points in the MFD 108$_1$ and the MFD 108$_2$ based on the operating parameters.

In one embodiment, the processor 202 may provide suggested changes to the operating parameters 210 based on the calculated life set point. For example, if the calculated life set point is lower than the default life set point, the processor 202 may suggest changes to the operating parameters 210 to increase the life set point. The changes may be based on operating parameter data collected from other MFDs 108 across the network 100. For example, the processor 202 may access optimized operational parameter data from the DB 106 that is collected by the AS 104 from all of the MFDs 108 across the network 100. The MFD 108 may compare the operating parameters 210 to the optimized operational parameter data and may suggest changes based on differences detected between the operational parameters 210 and the optimized operational parameter data.

In one embodiment, the suggested changes may be presented in the GUI on the display 218. If a confirmation is received, the operational parameters 210 may be changed accordingly. In one embodiment, suggested changes may be presented as a selectable list such that the customer or user may select which suggested changes to implement. For example, the customer may decrease coverage, but have to use a particular size paper.

In one embodiment, when the calculated life set point for a particular component 216 is reached, the processor 202 may generate a notification. In one embodiment, a warning may be generated and shown on the display 218 at predetermined intervals up to the calculated life set point. For example, when the component 216 reaches 90% of the calculated life set point, the processor 202 may generate a warning indicating that the component 216 may need to be replaced soon.

In one embodiment, the notification may be an email or text message to a service engineer of the service provider that manages the MFD 108. For example, the email may be transmitted by the communication interface 214. In one embodiment, the notification may be a message that is shown on the display 218.

In one embodiment, the notification shown on the display may ask a customer if the customer would like to schedule an appointment for a service technician to come replace the component 216 that has reached the calculated life set point. In one embodiment, a customer or user may enter the desired date and time via the GUI shown on the display 218.

In one embodiment, the processor 202 may automatically suggest a date and time based on the monitoring data 212 that is stored in the memory 204. For example, the processor 202 may collect the monitoring data 212 as the MFD 108 is operated over time. The monitoring data 212 may track when the MFD 108 is operating (e.g., what days and times the MFD 108 is operated). The processor 202 may then determine based on the monitoring data 212 when the MFD 108 is least frequently used and may suggest that date and time period as a possible appointment time for a service technician.

If a confirmation is received, the processor 202 may send a notification to the remotely located server (e.g., the AS 104). The notification may include information related which component 216 in the MFD 108 is to be replaced, an identification of the MFD 108, a location of the MFD 108, an identification of the customer, and the suggested date and time based on the monitoring data 212. If the suggested date and time is available, the AS 104 may schedule an appointment in the scheduling database stored in the DB 106.

In one embodiment, the processor 202 may keep track of which components 216 have reached the calculated life set point. In one embodiment, the processor 202 may coordinate a date and time based on the monitoring data 212 to replace all of the components 216 at once to minimize the number of trips by a service technician to a customer location and to minimize a number of times that the MFD 108 is deactivated for service.

In one embodiment, the MFDs 108 may all be within a building of a customer location. The AS 104 may coordinate a date and time to replace various components 216 that have reached the calculated life set point for various MFDs 108 based on the notifications received from the MFDs 108$_1$-108$_n$ at the customer location. The AS 104 may then schedule a date and time that may allow a maximum number of components 216 to be replaced with a single trip to the customer location by a service technician. The date and time may be based on the monitoring data 212 collected from the different MFDs 108 to also be the least disruptive to the operation of the MFDs at the customer location.

As a result, the MFDs 108 of the present disclosure may automatically change or update a life set point value of different components within the MFD based on operating parameters. The MFDs 108 may be able to provide suggestions to improve or increase the calculated life set point based on known optimized operating parameters based on data collected from different MFDs connected to the IP network 102 and in communication with the AS 104. Based on the monitoring data 212, service appointments may be automatically scheduled to replace a component 216 that has reached the calculated life set point with minimal trips by a service technician and minimal disruption to the operation of the MFD 108.

Figure 3:
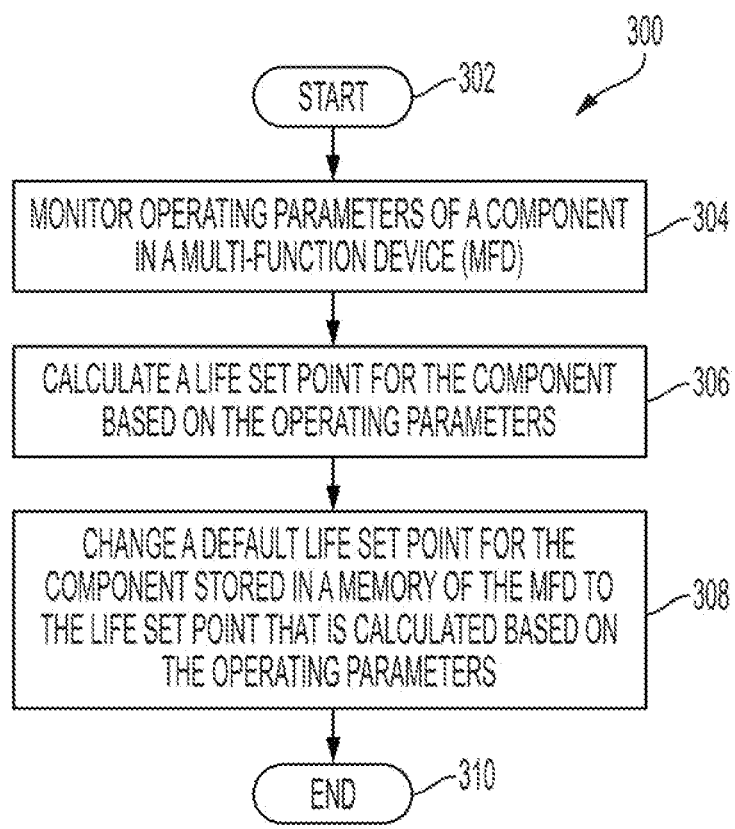
FIG. 3 illustrates a flow chart of a method for adjusting life set points stored in an MFD of the present disclosure.

FIG. 3 illustrates a flow chart of an example method 300 for adjusting life set points stored in an MFD of the present disclosure. In one embodiment, the method 300 may be performed by the MFD 102 or an apparatus, such as the apparatus 500 illustrated in FIG. 5 and discussed below.

In one embodiment, the method 300 begins at block 302. At block 304, the method 300 monitors operating parameters of a component in the MFD. For example, the operating parameters may be environmental parameters of a location associated with the MFD or may be settings for a print job, a copy job, a scan job, and the like, executed by the MFD.

At block 306, the method 300 calculates a life set point for the component based on the operating parameters. The life set point may be calculated based on a comparison to known operating parameters with associated life set points or using a pre-determined function, as described above.

For example, a function may be predetermined that correlates the operating parameters for a particular component to a life set point. In one embodiment, data for various MFDs that operate with different operating parameters may be collected over time. The data may be correlated to generate the function for that particular component to calculate the life set point. Different components may have different functions that are used to calculate a life set point for the respective component.

At block 308, the method 300 changes a default life set point for the component stored in a memory of the MFD to the life set point that is calculated based on the operating parameters. For example, the default life set point stored in the memory of the MFD may be updated to the value of the calculated life set point. Thus, different MFDs may have different life set points for the same component based on the different operating parameters of the respective MFDs.

In one embodiment, changes to the operational parameters may be suggested if the calculated life set point is lower than the default life set point. For example, the suggested changes may be presented on the display of the MFD. The user may select the desired changes to try and increase the life set point of the component in the MFD. At block 310, the method 300 ends.

Figure 4:
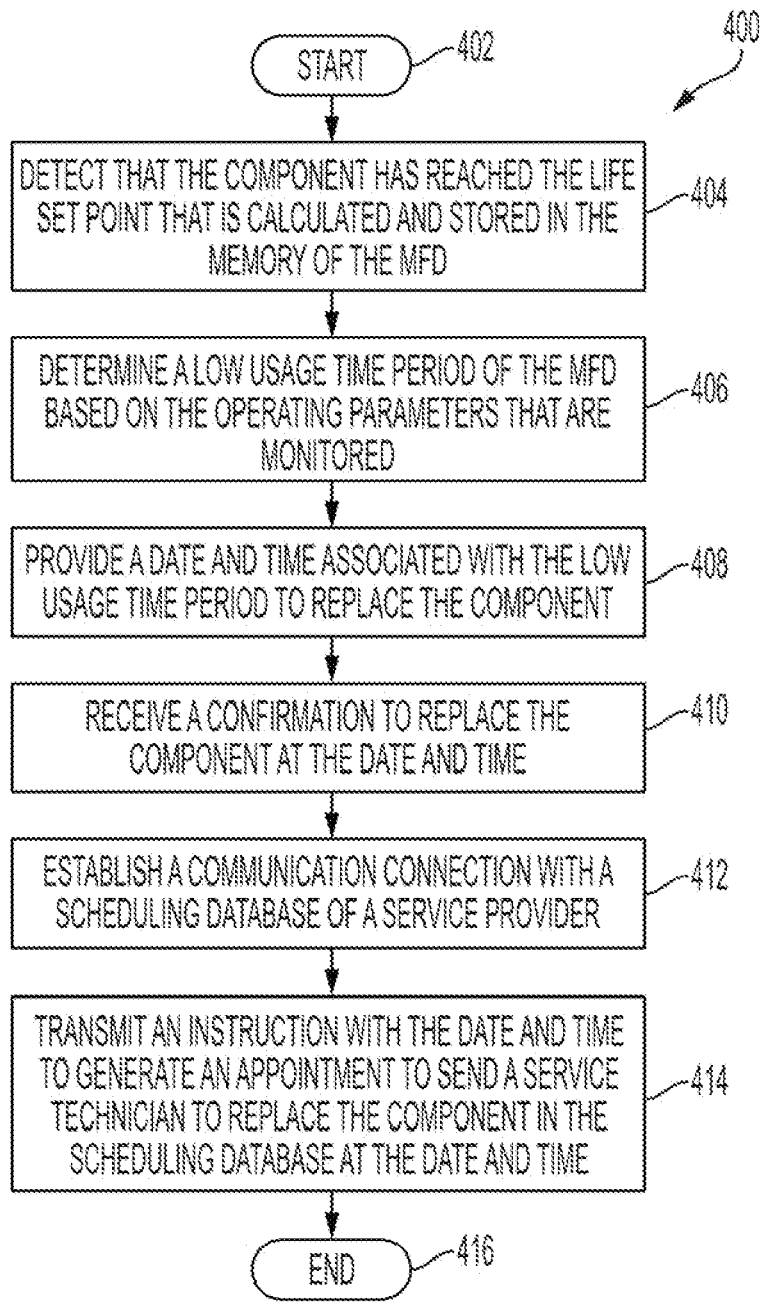
FIG. 4 illustrates a flow chart of a method for automatically scheduling a service technician to replace a component in the MFD that has reached a life set point of the present disclosure.

FIG. 4 illustrates a flow chart of an example method 400 for automatically scheduling a service technician to replace a component in an MFD that has reached a life set point of the present disclosure. In one embodiment, the method 400 may be performed by the MFD 102 or by an apparatus, such as the apparatus 500 illustrated in FIG. 5 and discussed below.

In one embodiment, the method 400 begins at block 402. At block 404, the method 400 detects that the component has reached the life set point that is calculated and stored in the memory of the MFD. For example, operation of the MFD and the components within the MFD may be monitored. The parameter associated with the life set point may be monitored for each component. For example, a photoreceptor may have a life set point based on a number of drum revolutions, a fuser roller may have a life set point based on a number of pages printed, and so forth. The method 400 may also monitor when the MFD is operated (e.g., dates and times).

At block 406, the method 400 determines a low usage time period of the MFD based on the operating parameters that are monitored. For example, a date and time that the MFD has a least amount of usage or relatively low amount of usage compared to other dates and times may be identified.

At block 408, the method 400 provides a date and time associated with the low usage time period to replace the component. In one embodiment, a notification may be presented in a GUI on a display of the MFD.

At block 410, the method 400 receives a confirmation to replace the component at the date and time. The notification may present an option to accept the date and time or may include a field to have the customer enter a user selected date and time. In one embodiment, the MFD may communicate with a scheduling database in a service provider network to determine available dates and times to schedule an appointment. The available dates and times may be presented to the user via the display of the MFD.

At block 412, the method 400 establishes a communication connection with a scheduling database of a service provider. For example, the MFD may have a wired or wireless communication interface that may establish a communication path with the scheduling database of the service provider.

At block 414, the method 400 transmits an instruction with the date and time to generate an appointment to send a service technician to replace the component in the scheduling database at the date and time. In one embodiment, the instruction may include an identification of the component that is to be replaced, a location of the MFD, an identification number of the MFD, and the like. At block 416, the method 400 ends.

Figure 5:
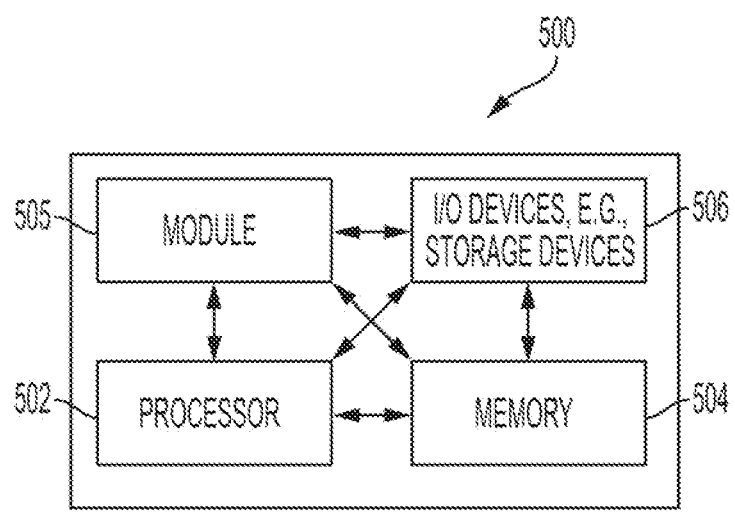
FIG. 5 illustrates a high-level block diagram of an example computer suitable for use in performing the functions described herein.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for adjusting life set points stored in an MFD, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for adjusting life set points stored in an MFD (e.g., a software program comprising computer-executable instructions) can be loaded into memory 504 and executed by hardware processor element 502 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for adjusting life set points stored in an MFD (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
monitoring, by a processor of a multi-function device (MFD), operating parameters of a component in the MFD, wherein the operating parameters comprise environmental conditions of a room where the MFD is located and settings for a print job executed by the MFD, wherein the environmental conditions comprise a temperature and a humidity of the room where the MFD is located, and wherein the settings comprise a job length, a media size, and a frequency of usage of the MFD;
calculating, by the processor, a life set point for the component based on the operating parameters, wherein the calculating comprises:
identifying, by the processor, known operating parameters that match the operating parameters of the component in the MFD, wherein the known operating parameters are selected from a plurality of known operating parameters obtained from monitoring networked MFDs; and
determining, by the processor, the life set point for the known operating parameters; and
changing, by the processor, a default life set point for the component stored in a memory of the MFD to the life set point that is calculated based on the operating parameters.

2. The method of claim 1, further comprising:
detecting, by the processor, that the component has reached the life set point that is calculated and stored in the memory of the MFD;
determining, by the processor, a low usage time period of the MFD based on the operating parameters that are monitored; and
providing, by the processor, a date and time associated with the low usage time period to replace the component.

3. The method of claim 2, further comprising:
receiving, by the processor, a confirmation to replace the component at the date and time;
establishing, by the processor, a communication connection with a scheduling database of a service provider; and
transmitting, by the processor, an instruction with the date and time to generate an appointment to send a service technician to replace the component in the scheduling database at the date and time.

4. The method of claim 1, further comprising:
detecting, by the processor, that a difference between the default life set point and the life set point that is calculated is greater than a difference threshold; and
generating, by the processor, an alert to indicate an potential issue associated with the component.

5. The method of claim 1, further comprising:
determining, by the processor, that the life set point that is calculated is less than the default life set point; and
causing, by the processor, a notification with suggested changes to the operating parameters of the MFD to increase the life set point to be displayed on a display of the MFD.

6. The method of claim 1, wherein the calculating comprises:
determining, by the processor, a life set point calculation function associated with the component; and
calculating, by the processor, the life set point using values associated with the operating parameters in the life set point calculation.

7. The method of claim 1, wherein the component comprises a high frequency service item.

8. The method of claim 7, wherein the high frequency service item comprises at least one of: a fuser roll, a photoreceptor, or a transfer assist blade.

9. A non-transitory computer-readable medium storing a plurality of instructions, which when executed by a processor of a multi-function device (MFD), causes the processor to perform operations comprising:
monitoring operating parameters of a component in the MFD, wherein the operating parameters comprise environmental conditions of a room where the MFD is located and settings for a print job executed by the MFD, wherein the environmental conditions comprise a temperature and a humidity of the room where the MFD is located, and wherein the settings comprise a job length, a media size, and a frequency of usage of the MFD;
calculating a life set point for the component based on the operating parameters, wherein the calculating comprises:
identifying known operating parameters that match the operating parameters of the component in the MFD, wherein the known operating parameters are selected from a plurality of known operating parameters obtained from monitoring networked MFDs; and
determining the life set point for the known operating parameters; and
changing a default life set point for the component stored in a memory of the MFD to the life set point that is calculated based on the operating parameters.

10. The non-transitory computer-readable medium of claim 9, wherein the operations further comprise:
detecting that the component has reached the life set point that is calculated and stored in the memory of the MFD;
determining a low usage time period of the MFD based on the operating parameters that are monitored; and
providing a date and time associated with the low usage time period to replace the component.

11. The non-transitory computer-readable medium of claim 10, wherein the operations further comprise:
  receiving a confirmation to replace the component at the date and time;
  establishing a communication connection with a scheduling database of a service provider; and
  transmitting an instruction with the date and time to generate an appointment to send a service technician to replace the component in the scheduling database at the date and time.

12. The non-transitory computer-readable medium of claim 9, wherein the operations further comprise:
  detecting that a difference between the default life set point and the life set point that is calculated is greater than a difference threshold; and
  generating an alert to indicate an potential issue associated with the component.

13. The non-transitory computer-readable medium of claim 9, wherein the calculating comprises:
  determining a life set point calculation function associated with the component; and
  calculating the life set point using values associated with the operating parameters in the life set point calculation.

14. The non-transitory computer-readable medium of claim 9, wherein the operations further comprise:
  determining that the life set point that is calculated is less than the default life set point; and
  causing a notification with suggested changes to the operating parameters of the MFD to increase the life set point to be displayed on a display of the MFD.

15. The non-transitory computer-readable medium of claim 9, wherein the component comprises a high frequency service item comprising at least one of: a fuser roll, a photoreceptor, or a transfer assist blade.

16. A method, comprising:
  monitoring, by a processor of a multi-function device (MFD), operating parameters of a component in the MFD, wherein the operating parameters comprise environmental conditions of a room where the MFD is located and settings associated with print jobs executed by the MFD, wherein the environmental conditions comprise a temperature and a humidity of the room where the MFD is located, and wherein the settings comprise a job length, a media size, and a frequency of usage of the MFD;
  obtaining, by the processor, a known function associated with the component from a remotely located server to calculate a life set point for the component in the MFD, wherein the known function is a correlation of previously observed operating parameters of a plurality of different networked MFDs to an observed life set point for the component;
  calculating, by the processor, the life set point for the component based on values of the settings associated with print jobs;
  determining, by the processor, that the life set point that is calculated is different than a default life set point for the component; and
  changing, by the processor, the default life set point for the component stored in a memory of the MFD to the life set point that is calculated.

* * * * *